United States Patent Office

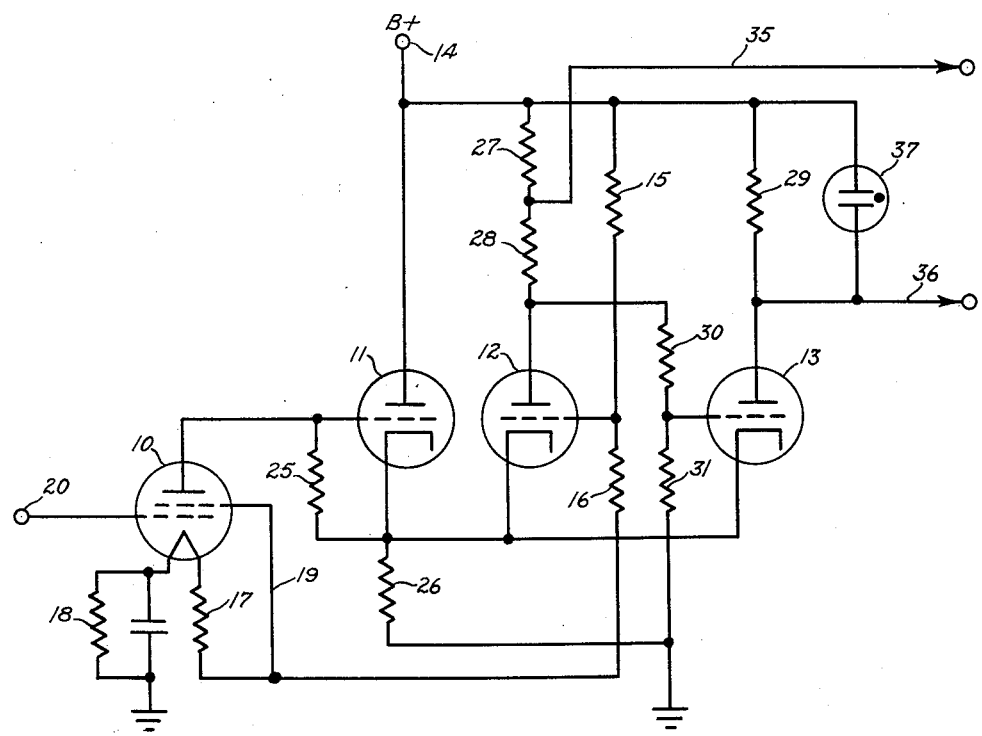

3,009,110
Patented Nov. 14, 1961

3,009,110
VOLTAGE LIMIT CONTROL CIRCUIT
Benjamin R. Cole, Arlington, and Edward J. Sheldon, Jr., Lexington, Mass., assignors, by mesne assignments, to the United States of America as represented by the Secretary of the Navy
Filed Feb. 3, 1959, Ser. No. 790,984
5 Claims. (Cl. 328—150)

This invention relates to a voltage limit control circuit and more particularly to a vacuum tube circuit for providing one output voltage signal level from the circuit for limited input voltages within a predetermined range and for providing another output voltage signal level from the circuit whenever either the maximum or minimum limit of the predetermined input voltage range is exceeded.

It is necessary in some applications of electronic circuitry to maintain operating conditions of a companion circuit within a predetermined voltage range and to provide some indication or circuit control to disable the circuit under conditions where the maximum or minimum limit of the predetermined operable voltage range is exceeded. In most known circuits of this type one circuit is used to indicate or disable circuit operation when one voltage limit is exceeded, and a separate circuit is used to disable the circuitry when the other voltage limit is exceeded, necessitating two independent circuits to carry out the function of maintaining circuit operation within a predetermined voltage range. Such circuits operate as electronic sentinels to electronic control circuits to give proper warning or to disable the circuits whenever any voltage gets out of control or a tube element or component becomes disabled to place excessive or insufficient voltages in the circuitry.

In the present invention a single vacuum tube circuit is used to provide an indication and to produce an output voltage signal capable of indicating or controlling companion electronic circuitry whenever the voltage in the companion circuitry exceeds the maximum or minimum limit of its range of proper operation. In this voltage limit control circuit an electrometer tube having the characteristics of operating on very low voltages and low grid currents is used to control a cathode follower tube of a two-triode vacuum tube circuit operating in a push-pull manner with a common cathode to produce variable voltage signals on the anode of the second triode tube section. A limiter triode tube, having its cathode coupled in common with the cathodes of the double triode tube and its control grid coupled in a voltage divider circuit from the anode of the second double triode tube to ground, produces anode voltages indicative of its conductive and nonconductive periods in accordance with the maximum and minimum limits of an input voltage signal on the grid of the electrometer tube. When the minimum voltage signal of the predetermined input voltage range is reached or exceeded, the second of the two triode sections will conduct heavily to cause the grid voltage in the limiter tube to become less positive with respect to its cathode, causing limiter tube conduction cutoff. When the maximum voltage is reached in the predetermined voltage range on the grid of the electrometer tube, the first of the triode sections will conduct heavily to cause cathode voltage to go positive with respect to the grid voltage in the limiter tube, thereby cutting off limiter tube conduction. Thus, when either limit of the predetermined voltage is reached the conduction of the limiter tube will be cut off, whereupon the anode voltage of this tube may be utilized in either indicating or controlling companion circuitry until the defective circuitry is reconditioned for proper use.

It is therefore a general object of this invention to provide a sensitive vacuum tube voltage control circuit capable of producing output voltage signal levels, one voltage signal level indicative of tolerable limits of an input voltage within a predetermined voltage range of maximum and minimum voltage limits, and another voltage signal level indicative of intolerable limits whenever the input voltage exceeds either its maximum or minimum limit of the predetermined voltage range.

These and other objects, advantages, features, and uses may become more apparent to those of ordinary skill in the art when considered along with the accompanying drawing illustrating one preferred schematic wiring diagram of the invention.

Referring more particularly to the drawing, there is shown four vacuum tubes, 10, 11, 12, and 13, the first of which is an electrometer tube having a filament cathode, control and screen grids, and an anode. The filament cathode of the electrometer tube 10 is coupled from a B+ source at terminal 14 through a voltage divider circuit consisting of fixed resistances 15, 16, and 17 through the filament cathode and a fixed resistance 18 to ground. The resistor 18 has in parallel therewith a capacitor serving as a decoupling filter of this electrometer tube. The screen grid of the electrometer tube 10 is coupled at the junction of resistors 16 and 17 by way of a conductor 19. The control grid of the electrometer tube is adapted to be coupled at a terminal 20 to a companion circuit, which companion circuit is to be maintained in an operative condition for all values of voltage within a predetermined voltage range. For an example, the input terminal 20 may be coupled to a comparison circuit for comparing two voltages, the difference of which is applied to terminal 20 and to be maintained within a predetermined range of voltages for proper operation of the companion circuitry.

The anode of the electrometer tube 10 is coupled directly to the grid of the first triode tube section 11 and through a resistor 25 to the cathodes of tubes 11, 12, and 13 coupled in common. A common cathode resistor 26 couples the common cathodes to ground. The resistors 25 and 26 provide the anode voltage for the electrometer tube 10, this voltage being low since the voltage requirements of an electrometer tube are low. The grid of the triode tube section 12 is coupled to the junction of the voltage divider circuit between the resistances 15 and 16 to establish a fixed grid bias on the triode tube section 12. The anode of the triode tube section 11 is directly coupled to the B+ source at terminal 14 which will cause this tube section to function as a cathode follower. The anode of triode tube section 12 is provided anode voltage from the terminal 14 through the resistors 27 and 28 in series, and the anode of limiter tube 13 is coupled from the anode voltage supply 14 through a resistor 29. The anode of the triode tube section 12 is coupled through resistors 30 and 31 to ground, providing a voltage divider circuit for the grid of the limiter tube 13, this grid being coupled to the junction of resistors 30 and 31.

Where the circuit above described is used to control the bias of further circuitry, this voltage bias may be taken from the junction of the anode resistors 27 and 28 of the triode section 12 through a biasing conductor means 35 to a point of use. The conduction of the triode tube section 12 will determine the voltage drop across the resistors 27 and 28, whereupon the biasing voltage on conductor 35 may be established by the proper resistive relationship of the resistances 27 and 28. The anode voltage of the limiter tube 13 may be used in an output circuit 36 to control relays and of vacuum tube switching circuits, with or without phase inverters, to control the capabilities of the companion circuit supplying the input voltages to terminal 20. Where it is desirable to have a visual indication of the conductive and nonconductive periods of the limiter tube 13, a neon tube 37 may be placed in parallel with the anode resistance 29 whereby the neon tube will glow during conductive periods of the limiter tube 13 by reason of the voltage drop across the resistance 29 and will be extinguished during nonconductive periods.

In the operation of the above-described circuit, let it be assumed that a voltage signal of a companion circuit to be controlled within predetermined voltage limits of a few volts is applied to the terminal 20 and consequently to the control grid of the electrometer tube 10. If this voltage is within the maximum and minimum predetermined limits, conduction of the electrometer tube 10 will be such to produce normal conduction in the tube section 11 and the limiter tube 13, whereupon the indicator glow tube 37 will be glowing, indicating conduction of the limiter tube 13. The output signal voltage on the conductor 36 may be used to control subsequent relay or vacuum tube switching circuits to maintain the companion circuitry coupled to the input 20 in an operative condition. When the voltage at the input terminal 20 drops to a value below its minimum value of voltage range, electrometer tube 10 conduction will be reduced allowing the cathode voltage to rise toward B+ by virtue of reduced current through the cathode resistor 17 and the anode voltage will go lower toward ground potential by virtue of less current flow through the anode resistor 25. The grid voltage of tube 11 will drop since the grid of tube 11 is directly coupled to the anode of tube 10, reducing the cathode voltage since the cathode voltage will follow the grid voltage of this tube. In the normal operating range of the input predetermined voltage range, conduction of the triode sections 11 and 12 will be in an inverse order such that the current through the cathode resistor 26 will be substantially constant. However, when the lower voltage limit of the predetermined voltage input signal on terminal 20 is reached or exceeded, the conduction of the triode tube section 11 drops off, producing a tendency of cathode voltage to reduce toward ground to cause a greatly increased conduction through triode section 12 by virtue of its grid being at fixed voltage. The increased conduction of the triode section 12 increases the voltage drop across the anode resistors 27 and 28 to produce a voltage bias on the grid of the limiter tube 13 sufficiently to make it less positive with respect to its cathode sufficient to cut off the conduction of the limiter tube 13. Limiter tube 13 being cut off, the anode voltage rises substantially to the B+ voltage of the terminal 14 which will extinguish the neon indicator tube 37 and cause control of companion circuitry over the output conductor 36.

When the voltage applied to the input terminal 20 rises to an amount above the upper limit of the predetermined voltage range, the electrometer tube 10 will increase in conduction which will raise its anode voltage toward that of the cathode voltage since this voltage is produced across the resistors 25 and 26 to ground. The control grid voltage of the triode tube section 11 will rise, causing a high conduction of the tube section 11 and substantial conduction cutoff of the triode tube section 12, whereby the cathode voltage will rise abruptly. The grid bias of the triode tube section 12 being fixed, this tube will be cut off by virtue of the high potential of the cathode therein. The cathodes being coupled in common, the cathode voltage of limiter tube 13 approaches or exceeds the control grid voltage to cause conduction cutoff of this tube. Under this condition of an input voltage exceeding the upper voltage limit on the input terminal 20, limiter tube 13 will be cut off in like manner as for the condition where the lower limit of the predetermined input voltage signal is exceeded. It may therefore be seen from the above description of operation that under either condition of the input voltage applied to the terminal 20 exceeding predetermined limits necessary for proper operation, the voltage limit control circuit by control of the conduction of the limiter tube 13 may be used to control the companion circuitry, either by disabling or by indication, until such circuitry can be reconditioned to bring the input voltage back within its predetermined limits.

As an example of one use of the voltage limit control circuit, such a circuit may be used in conjunction with a companion calibrating circuit used for controlling the bias of a frequency counter or frequency converter circuit to maintain the frequency-to-voltage conversion in the counter circuit in a proper proportional relationship. The bias of such a counter circuit may be coupled to the biasing conductor 35, whereupon this bias will be maintained correct for proper proportional control of the counter or frequency converter circuit. Whenever the limits of the fequency counter or converter circuit are exceeded by reason of circuit malfunction, either of itself or of related circuitry, the limits of the predetermined voltage applied to the terminal 20 will be exceeded, whereupon conduction of the limiter tube 13 will be cut off and relay or vacuum tube switching circuits coupled to the conductor tube 36 may be used to disable the counter or frequency converter circuit. While this voltage limit control circuit is readily adaptable for calibration circuits, as above described, it is to be understood that it is not limited thereto and may find use wherever a circuit is to be maintained within predetermined voltage upper and lower limits for the proper operation thereof.

While many modifications and changes may be made in the constructional relationship of the circuit so described to adapt this voltage limit control circuit for various applications without departing from the scope and teaching thereof, it is to be understood that we desire to be limited only by the scope of the appended claims.

We claim:

1. A voltage limit control circuit comprising: an input vacuum tube circuit having a control grid adapted to receive input voltages; an output vacuum tube circuit having an anode adapted to provide output voltages; and an intermediate circuit including first and second triode tube sections having the cathodes thereof coupled in common with the cathode of said output vacuum tube circuit, having the grid of the first triode tube section coupled to the anode of said input vacuum tube circuit, having an anode of the second triode tube section coupled to the grid of said output vacuum tube circuit through a voltage divider network to provide voltage changes on said grid proportional to anode voltage changes, and having a fixed grid bias on the grid of said second triode tube section, said commonly coupled cathodes being biased and the anodes of said second vacuum tube section and said output vacuum tube circuit being coupled to a voltage supply through load resistors and the anode of said first vacuum tube section being coupled directly to said voltage supply such that at the lower limit of a predetermined input voltage range the grid voltage of said output vacuum tube circuit will be less positive than the cathode voltage to prevent conduction thereof and at the upper limit of the predetermined input voltage range the cathode voltage will become more positive than the grid voltage of said output vacuum tube circuit to prevent conduction thereof whereby conduction of the output vacuum tube circuit occurs only within said predetermined range of input voltages.

2. A voltage limit control circuit as set forth in claim 1 wherein said input vacuum tube circuit is an electrometer tube circuit wherein said predetermined voltage range has very small voltage upper and lower limits.

3. A voltage limit control circuit for producing two states of voltage level in a circuit responsive to voltages within and without predetermined limits of voltage range comprising: an electrometer tube circuit having a control grid adapted for coupling to receive input voltages to be maintained within a predetermined voltage range; two triode tube sections coupled in circuit with the cathodes coupled in common and the common coupling coupled through a cathode resistor to a fixed potential, the grid of one of said two triode tube sections being coupled to the anode of said electrometer tube and the grid of the other of said two triode tube sections being coupled to a fixed potential bias, the anode of said one triode tube section being coupled to an anode voltage source and the anode of said other triode tube section being coupled to said anode voltage source through a resistor; a triode limiter tube circuit having its cathode coupled in common with the cathodes of said two triode tube sections, its grid coupled in a voltage divider circuit between the anode of said other triode tube section and ground, and its anode coupled to said anode voltage source through a resistor; means coupled in the anode circuit of said limiter tube to indicate limiter tube conduction, said anode circuit adapted to be coupled in an output circuit for controlling same in accordance with said input voltage; and means coupled to said anode circuit of said other of triode tube sections to provide output biasing voltages whereby one voltage state of the anode of the triode limiter tube will indicate the voltage applied to the grid of the electrometer tube to be within the predetermined voltage range and the other voltage state of the limiter tube anode will indicate one of the maximum and minimum input voltage limits exceeded.

4. A voltage limit control circuit as set forth in claim 3 wherein the anode bias of said electrometer tube circuit is from the cathode circuit of said two triode tube sections.

5. A voltage limit control circuit as set forth in claim 3 wherein the anode of said one triode tube section is directly coupled to said anode voltage supply providing a cathode follower wherein the cathode voltage controls conduction in said other triode tube section, the cathode voltage and the conduction of said other triode tube section controlling the grid to cathode voltage relationship of said limiter tube.

References Cited in the file of this patent
UNITED STATES PATENTS

| | | |
|---|---|---|
| 2,464,594 | Mahoney | Mar. 15, 1949 |
| 2,470,240 | Crosby | May 17, 1949 |
| 2,480,201 | Selove | Aug. 30, 1949 |
| 2,624,789 | Dean | Jan. 6, 1953 |
| 2,732,494 | Hall | Jan. 24, 1956 |
| 2,863,048 | Theall et al. | Dec. 2, 1958 |
| 2,898,457 | Auerbach | Aug. 4, 1959 |

FOREIGN PATENTS

| | | |
|---|---|---|
| 717,139 | Great Britain | Oct. 20, 1954 |

OTHER REFERENCES

"Radio And Electronic Engineering," Terman, McGraw-Hill, 4th edit., 1955, page 254.